United States Patent
Zucker (10) Patent No.: US 7,423,563 B2
(45) Date of Patent: Sep. 9, 2008

(54) SERIAL DATA TRANSFER IN A NUMERICALLY CONTROLLED CONTROL SYSTEM TO UPDATE AN OUTPUT VALUE OF THE CONTROL SYSTEM

(75) Inventor: Friedhelm Zucker, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 11/641,208

(22) Filed: Dec. 19, 2006

(65) Prior Publication Data

US 2007/0162155 A1    Jul. 12, 2007

(30) Foreign Application Priority Data

Dec. 22, 2005  (EP) ................. 05112809

(51) Int. Cl.
*H03M 9/00* (2006.01)
(52) U.S. Cl. ............................. 341/100; 341/155
(58) Field of Classification Search .......... 341/100–155
See application file for complete search history.

(56) References Cited

U.S. PATENT DOCUMENTS

| | | | |
|---|---|---|---|
| 3,430,036 A | 2/1969 | Patrick | |
| 3,794,902 A | 2/1974 | Ishigaki et al. | |
| 4,079,372 A | 3/1978 | Koenig et al. | |
| 6,198,415 B1 * | 3/2001 | Yoshikawa et al. | 341/100 |
| 6,452,526 B2 * | 9/2002 | Sagawa et al. | 341/100 |
| 6,801,144 B2 * | 10/2004 | Matsudera et al. | 341/100 |
| 7,006,021 B1 * | 2/2006 | Lombaard | 341/100 |

FOREIGN PATENT DOCUMENTS

JP   2004 505289 T   2/2004

OTHER PUBLICATIONS

European Search Report, Jun. 6, 2006.

* cited by examiner

*Primary Examiner*—Lam T Mai
(74) *Attorney, Agent, or Firm*—Joseph J. Laks; Jeffrey M. Navon (57) ABSTRACT

The invention relates to a serial data transfer in a numerically controlled control system to update an output value of the control system. A variable write depth shift register is used to update an output value of the control system in such a way that only a number of bits of a data word, which has to be updated to form the updated output value via a serial data transfer is transferred to the variable write depth shift register, so that the output value is updated in a shorter time and can be updated more frequently. The variable write depth shift register is applicable in a numerically controlled control system in which long data words and shift register are used to update the output value via serial data transfer.

9 Claims, 6 Drawing Sheets

SERIAL DATA TRANSFER IN A NUMERICALLY CONTROLLED CONTROL SYSTEM TO UPDATE AN OUTPUT VALUE OF THE CONTROL SYSTEM

This application claims the benefit, under 35 U.S.C. § 119 of European Patent Application 05112809.8, filed Dec. 22, 2005.

FIELD OF THE INVENTION

The invention relates to a serial data transfer in a numerically controlled control system, in which an output value of the control system becomes updated by a serially received control word. Especially in a control system wherein changes of some bit values of the data word occur more frequently the output value of the control system becomes updated earlier and more frequently.

BACKGROUND OF THE INVENTION

It is well known to use a shift register in a digital control device for a serial data transfer from a controller or processor to said control device especially if a small number of control lines or a small number of pins or signals for an integrated circuit shall be used. The serial data transfer is slow in comparison to a parallel one because a data word representing a control value has to be transmitted by subsequent rising edges of a clock signal shifting 1-bit data into a shift register. The complete control or data word has to be transmitted and received for an update of the output value of the control system. In cases of long data words represented by a large number of 1-bit data, the complete writing of the data word into a shift register takes a significant amount of time. On the other hand the direct digital synthesis technology provides very fast and precise control devices as e.g. a numerically controlled oscillator AD9850 manufactured by Analog Devices, which has a shift register lengths of 40 bits and allows an output frequency resolution of 0.0291 Hz with a 125 MHz reference clock applied. The output frequency can be digitally changed at a rate of up to 23 million new frequencies per second. The AD9850 comprises a 40-bit register, which can be loaded in a parallel or serial mode. In serial load mode, subsequent rising edges of a clock signal shift the 1-bit data on one pin through the 40 bits of programming information. After 40 bits are shifted through, a frequency update pulse is required to update the output frequency or phase provided by the control device. That means, where large shift registers are used, the complete writing will take a significant amount of time to update an output value of the control system.

SUMMARY OF THE INVENTION

It is an aspect of the invention to provide an arrangement and a method for a serial data transfer in a numerically controlled control system to improve an updating of the output value in a control system in which changes of some bit values of control words occur more frequently without to leave the serial data transfer mode or to increase the clock frequency.

This object is achieved by means of the features specified in independent claims. Advantageous embodiments are specified in dependent claims.

It is an aspect of the invention to reduce the time required to update an adjusted output value in a numerical control system, which uses serial data transfer and wherein some bit values more frequently alter than other bit values. The control system uses only the three lines generally required for a serial data transmission as well as a comparable clock frequency. Especially in a digital or numerical control system wherein some bit values alter more frequently, the output value of the control system will be updated faster although a serial data transfer is used to control the output value of the control system. It is an aspect of the invention to update only the bits that need to be updated to form a new data word via a serial data transfer, to avoid that in cases where only bit values near to the input of the shift register have to be altered it has to be waited until the complete data word has been received. This is achieved by a variable write depth shift register, wherein more frequently altering bit values are arranged near to the input of the shift register and the shift register is controlled by an amended strobe signal. Instead of the well known strobe signal, which is used to enable that the output signals of a shift register after receiving a complete data word update an output value of the control system, an amended strobe signal or a so-called receive signal is used. The receive signal determines start and end of the data transfer and enables the update of the bit values of a control word, which have to be taken over. In opposite to a standard shift register, in which 1-bit data are complete shifted from the input to the end through the shift register and said shifting requires a completely transferred control word, outputs of the variable write depth shift register, which do not have to be altered in comparison to a previous received data word, keep their status according to the previous received data word. That means that in conditions where some bit values do not have to be altered in comparison to the previous control word, the corresponding bit values need not to be transferred and received again.

That means that an update of the output value of the control system can already be performed by a part of a complete data word and before all bits of a complete control word have been received. Updating the output value in a control system in which changes of some bit values occur more frequently becomes improved. Bit values, which alter more frequently are normally lower bit values and for other cases, data words are constructed in such a way that bit values, which alter more frequently occur near to the input of the shift register. In addition to the reduced time required to update the output value, the number of data bits, which has to be transferred from a data word source as e.g. a controller or processor becomes reduced and it is possible to update the output value of the control system more frequently. According to an embodiment of the invention, an arrangement of a variable write depth shift register comprises an enable shift register, which ensures that in cases, where e.g. only bits next to the input of the input shift register have to be updated that only said bit values become latched to the output of the variable write depth shift register for updating the data word and said enable shift register avoids furthermore that wrong bit values deeper in the input register, which have not been updated and may be wrong due to shifting only the bits next to the input into the shift register, occur at the output of the variable write depth shift register. Output stages for bit values, which need not to be altered keep the previous status. The write depth of the variable write depth shift register is determined by the so-called receive signal provided from a serial data source to control or update the output value or output signal of the control system. The receive signal is a binary signal, which indicates start and end of the data transfer, enables the update to the new data word at the output of the variable write depth shift register and resets the enable shift register, which counts via received clock pulses the number of received bits for an update. According to said embodiment of the invention the enable shift register is realized by a number of flip-flops and And-gates, which corresponds to the length of a complete data word and an inverter. The enable shift register and the known input shift register to receive serial data are then combined to form said variable write depth shift register.

According to a second embodiment of the invention a counter is used, which counts the number of received bits or clock pulses and enables via a decoder a corresponding number of flip-flops of a latch register for updating the data word at the output of the variable write depth shift register.

The specific nature of the invention as well as other objects, advantages, features and uses of the invention will become evident from the following description of embodiments taken in conjunction with the accompanying drawings.

BRIEF DESCRIPTION OF PREFERRED EMBODIMENTS

The invention is explained in more detail with reference to exemplary embodiments illustrated in drawings, in which.

DETAILED DESCRIPTION OF PREFERRED EMBODIMENTS

Like numerals and characters designate like elements throughout the figures of the drawings.

In order to keep the embodiments short and illustrative, the invention will be illustrated by comparable examples with four bit data words and a person skilled in the art will be able to apply the principle for data words having more or less bits and corresponding embodiments.

Figure 1:
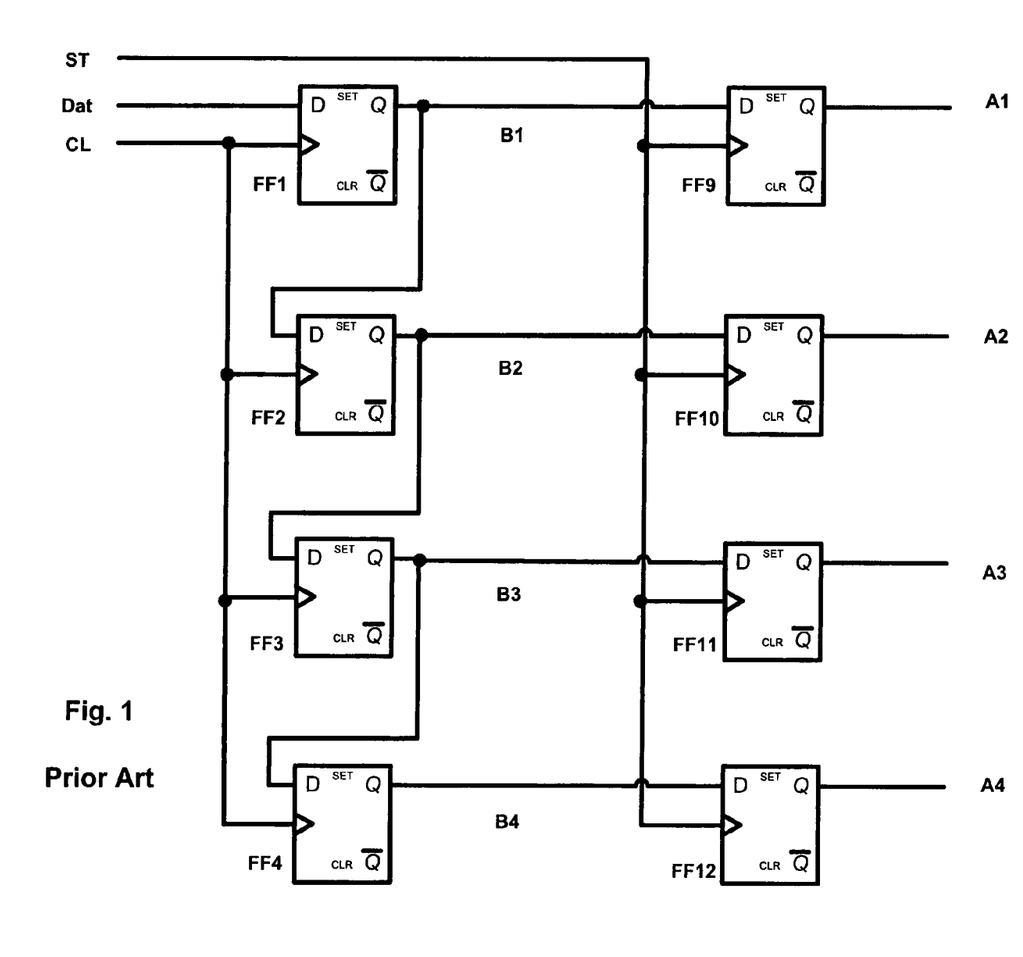
FIG. 1 shows a circuit diagram of a known arrangement for a serial data transfer in a numerically controlled control system to update an output value of the control system.
Figure 3:
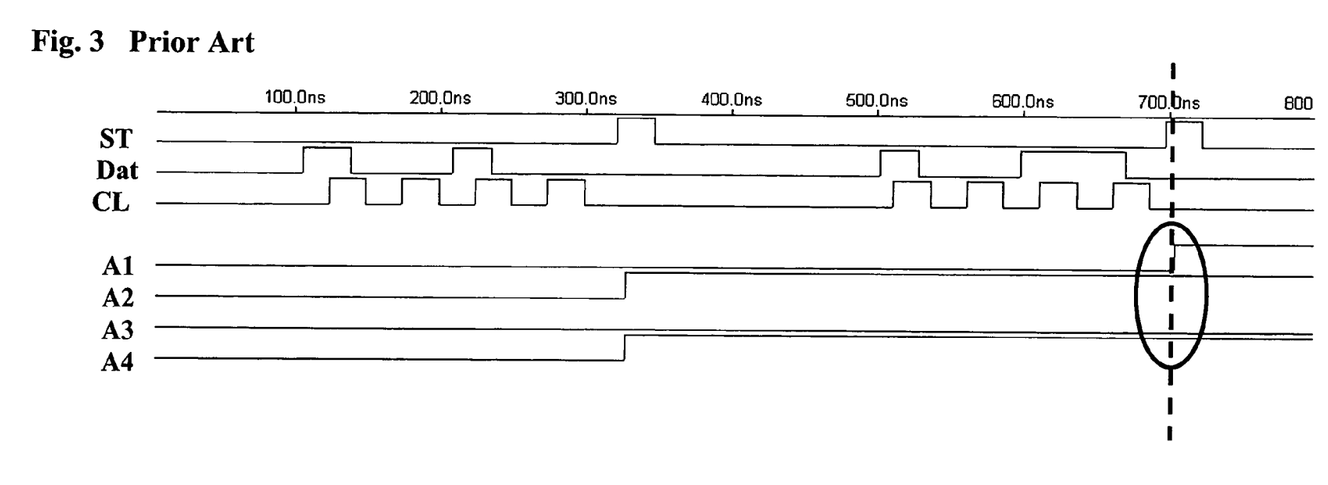
FIG. 3 shows a signal diagram of the binary values of a known serial data transfer in a numerically controlled control system to update an output value of the control system.

In a know numerically controlled control system, as e.g. a numerically controlled oscillator, a serial data transfer from a data word source as e.g. a controller or processor to the control device is used. The circuit diagram illustrated in FIG. 1 exemplarily shows a known serial-in/parallel-out shift register, which is used to save temporary a data word provided via serially data transfer from a not shown data source to a not shown control system. Serial-in/parallel-out shift register or so called output shift register transform serial data into parallel data and recover in such a way a data word provided from a data word source via a serial data transfer. The term register can be used in a variety of specific applications, but in all cases it refers to a group of flip-flops operating as a coherent unit to hold data. In accordance with the exemplary embodiment illustrated in FIG. 1, a known output register for a four bit data word is formed by a shift register and a so called latch register. The shift register takes a serial data stream and converts it to a parallel data bus. The serial data stream is provided by serial data bus comprising three lines, which provide a latch or so-called strobe signal ST, a data signal Dat and a clock pulse signal or clock CL. The clock pulses CL would have to be synchronized to the data signal Dat so that it toggles about in the middle of a data bit of the data signal Dat, which may be zero ore one. Every time the clock CL toggles, the data signal Dat present at the input is clocked into the first flip-flop FF1 of the input shift register. Whatever was in the first flip-flop FF1 is latched into the second one. The third one becomes equal to what the second one used to be and so on. The circuit is as shown in FIG. 1, wherein the input shift register comprises four D-flip-flop FF1 to FF4 each having an input D and a clock input illustrated by a triangle in the symbol of a flip-flop. The data signal Dat is applied to the input D of the first D-flip-flop FF1 and an output Q of each of the D-flip-flops FF1 to FF3 is connected with the input D of a next D-flip-flop FF2 to FF4. The clock inputs of the four D-flip-flop FF1 to FF4 are connected with each other and the clock signal CL is applied to said inputs. On every rising edge of the clock CL, the shift register reads the value from the data line providing the data signal Dat. The data signal Dat is fed into the serial in/parallel out shift register bit by bit, however, the four bits are all shifted out simultaneously, in parallel, as one word. This happens when all bits of a data word are fed into the input shift register. A status B1 to B4 at the outputs Q of the corresponding D-flip-flop FF1 to FF4 of the shift register represents then the data word. On a strobe signal ST from the so-called latch or strobe line, the data word is copied from the shift register to a latch register, thus data is transformed from serial into parallel data. According to FIG. 1, the latch register is formed by four D-flip-flop FF9 to FF12, whereby each input D of the D-flip-flops FF9 to FF12 is connected with an output Q of a corresponding D-flip-flop FF1 to FF4 of the input shift register and the clock inputs of the four D-flip-flop FF9 to FF12 of the latch register are connected with each other and supplied by the strobe signal ST. As the status B1 to B4 at the outputs Q of the D-flip-flops FF1 to FF4 of the input shift register alters, when the data signal Dat is shifted through it, said status B1 to B4 at the outputs Q is latched via said latch register until the next data word has been completely received and completely shifted through the input shift register. That means that a status A1 to A4 of the outputs Q of the D-flip-flops FF9 to FF12 of the latch register, which represents the bits of the data word, is kept if the serially received data signal Dat is fed into the shift register and becomes updated if a next data word has been completely received. A signal diagram of the binary values of the circuit illustrated in FIG. 1 is shown in FIG. 3. The duration, which is required until a status A1 to A4 of a data word is updated is illustrated by a time scale from 100 ns to 800 ns in FIG. 3. In a numerically controlled control system, wherein serially transferred four bit data words are used, the digital data signal Dat can be between 0000 and 1111, which gives 16 steps, suitable e.g. for a volume control etc. It is assumed that a transmission of a data signal Dat corresponding to a data word 1010 starts at a time scale of 100 ns as shown in FIG. 3, wherein the outermost left bit is the so-called most significant bit, which has to be shifted through to the end of the shift register. The clock pulses CL would have to be synchronized to the data signal Dat so that it toggles about in the middle of a data bit of the data signal Dat and after the four clock pulses CL for the data word have been transferred the strobe signal ST toggles for a period of about a clock pulse from zero to one for latching the transferred data word in the latch register shown in FIG. 1. The status A1 to A4 of the outputs Q of the D-flip-flops FF9 to FF12 of the latch register changes with the strobe signal ST to 1010 according to the received data word 1010 so that the status A1 is equal 0, the status A2 is equal 1, the status A3 is equal 0 and the status A4 is equal 1. It is further assumed that a transmission of a following data word 1011 starts at a time scale of 500 ns as shown in FIG. 3, then the status A1 to A4 of the outputs Q of the D-flip-flops FF9 to FF12 of the latch register becomes updated to 1011 at a time scale of 700 ns as illustrated by a vertical arranged dashed line and an ellipse, which surrounds the status A1 to A4 at that time in FIG. 3. That means that although only the status Al has to be updated an update takes place after the complete data word has been transferred and the strobe signal ST has been outputted. It is obvious that in cases of long data words represented by a large number of 1-bit data, as e.g. in the case of a numerically controlled oscillator AD9850, which has a shift register lengths of 40 bits, the complete writing of the data word into a shift register takes a significant amount of time. It is furthermore obvious that it can be expected that in such systems some bit values more frequently alter than other bit values.

It is therefore an aspect of the invention to provide an arrangement and a method for a serial data transfer in a numerically controlled control system to improve an updating of the output value.

Figure 4:
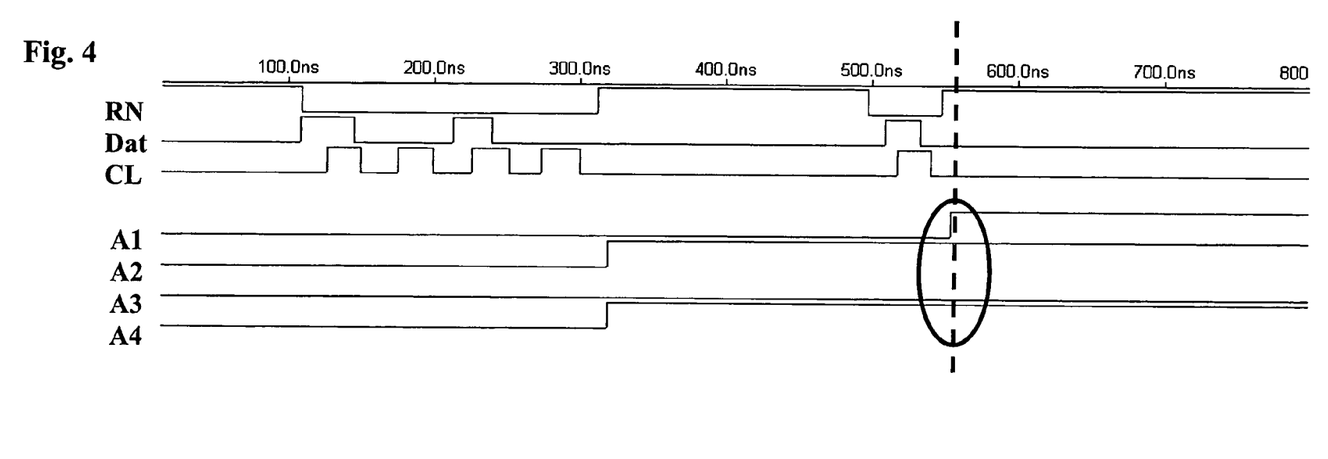
FIG. 4 shows a signal diagram of the binary values of a serial data transfer in a numerically controlled control system to update an output value of the control system with a variable write depth shift register.

This object is achieved in such a way that only the bits that need to be updated for a serial data transfer become transferred. At the side of the data word source as e.g. a controller or processor the content or status A1 to A4 of a previous sent data word is known and therefore it is possible to determine the bits of a current data word, which have to be updated to ensure that the current data word will be provided after serial-to-parallel conversion. That means that in a case where only the status B1 of the first flip-flop FF1 of the shift register has to be altered only the corresponding bit of the data word shall be transferred and latched by the latch register. Therefore a modified strobe signal ST, which is called receive signal RN, will be used to latch the status B1 so that the output shift register provides the updated data word by the status A1 to A4 of the latch register. Said receive signal RN will be provided via the line, which normally is used for the strobe signal ST and provided by the data word source, which generates said receive signal RN according to the number of bits, which have to be transferred for updating the data word. A signal diagram, which illustrates said method in an embodiment is shown in FIG. 4. To be compare-able with FIG. 3, it is assumed that a transmission of a data signal Dat corresponding to a data word 1010 also starts at a time scale of 100 ns. In difference to the strobe signal ST in FIG. 3, the receive signal RN in FIG. 4 alters from one to zero at start of data transfer and alters from zero to one for latching the data word. The data signal Dat and the clock signal CL in FIG. 3 and FIG. 4 correspond each other. As shown in FIG. 3, only the status of the bit next to the input of the shift register and the corresponding flip-flop of the latch register have to be updated to provide the updated data word at the output of the latch register. Therefore, according to the invention only said bit of the data word and a corresponding receive signal RN is serially transferred. The altered status of the first flip-flop FF1 of the shift register is latched by the receive signal RN so that the updated data word is much earlier present at the output of the output register in comparison with the prior art serial-in, parallel-out or so-called output shift register. This is indicated by a vertical arranged dashed line and an ellipse, which surrounds the status A1 to A4, at a time scale value of about 550 ns in FIG. 4. That means that in condition where some bit values have not to be altered in comparison to the previous control word the corresponding bit values need not to be transferred and received again, an update of the output value of the control system can already be performed before all bits of a complete control or data word have been received and the data word or the output value of the output shift register can be updated more frequently. Said effect increases with the length of the data words and the occurrence of bit values, which alter more frequently near to the input of the shift register. Bit values or the status of bits, which alter more frequently are normally lower bit values and for other cases, the bits of a data word can be arranged in such a way that bit values, which alter more frequently occur near to the input of the shift register. Said method is achieved by a variable write depth shift register, wherein more frequently altering bit values of a data word are arranged near to the input of the shift register and the shift register is controlled by an amended strobe signal ST, which is the so-called receive signal RN.

Figure 2:
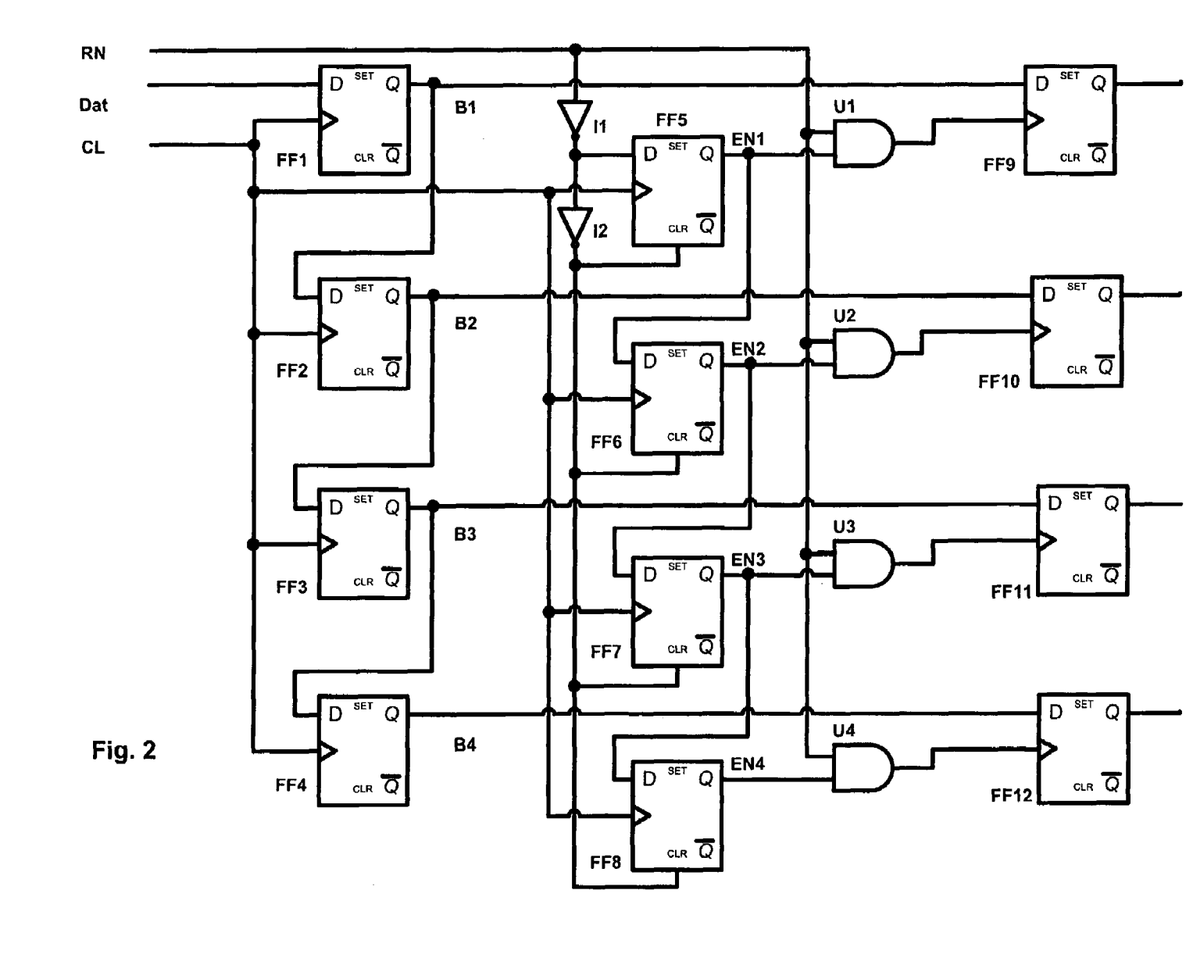
FIG. 2 shows a first embodiment for a circuit diagram of a variable write depth shift register for an improved serial data transfer in a numerically controlled control system to update an output value of the control system.
Figure 5:
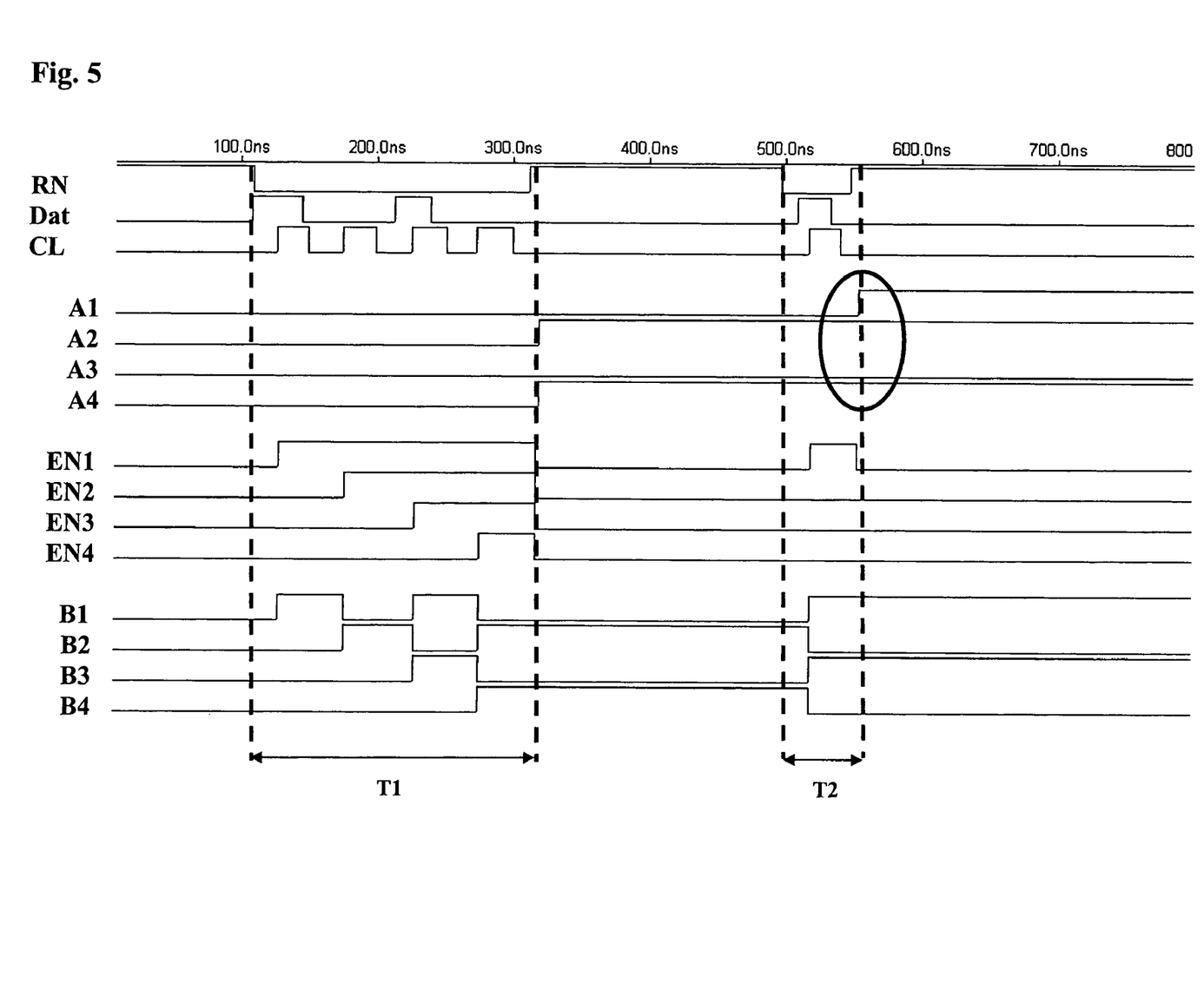
FIG. 5 shows a signal diagram of the binary values of a serial data transfer in a numerically controlled control system to update an output value of the control system with a variable write depth shift register.
Figure 6:
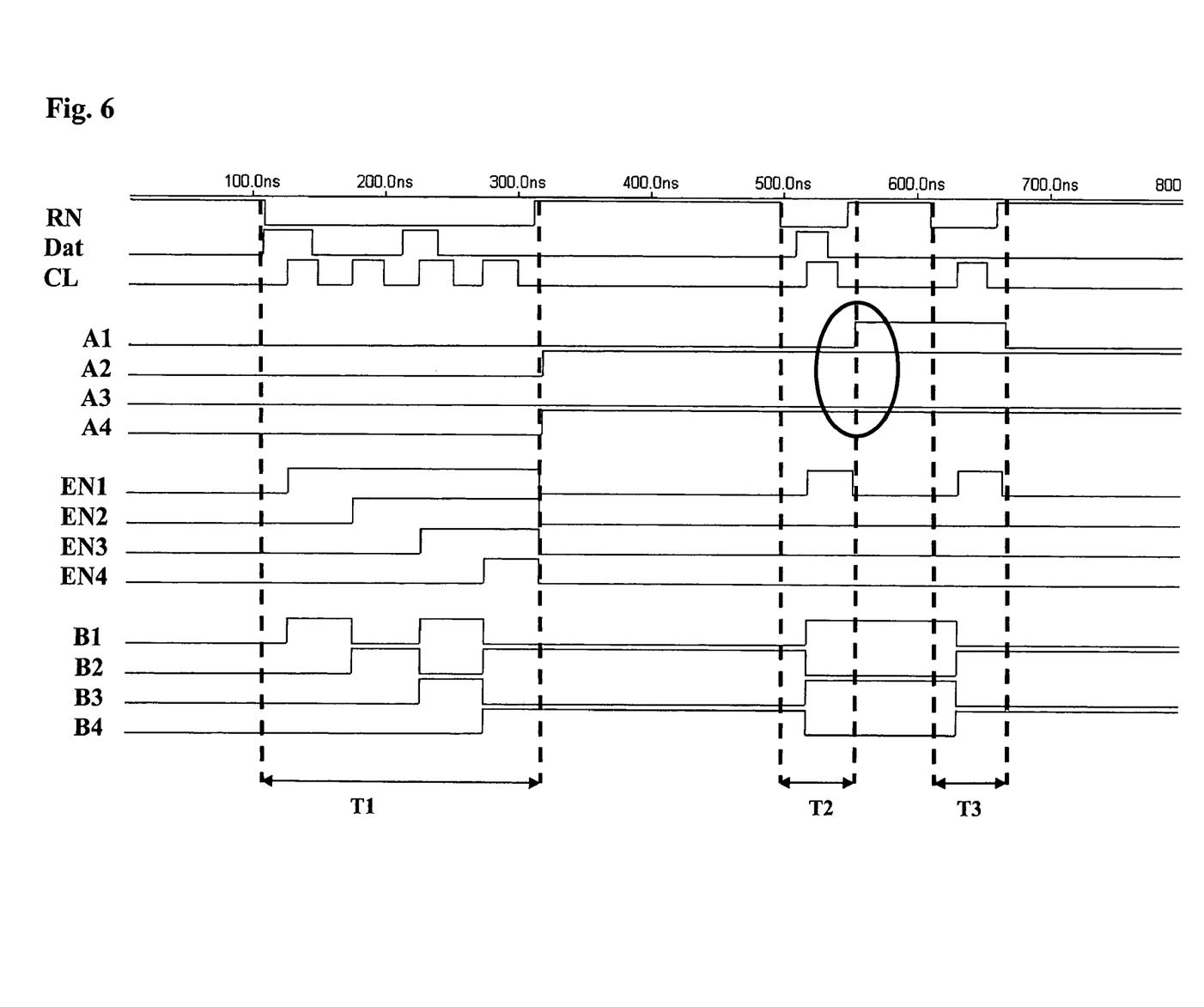
FIG. 6 shows a signal diagram of the binary values of a serial data transfer in a numerically controlled control system to update an output value of the control system with a variable write depth shift register more frequently as possible by using control words having a constant length and FIG. 7 shows a second embodiment for a circuit diagram of a variable write depth shift register for an improved serial data transfer in a numerically controlled control system to update an output value of the control system.
Figure 7:
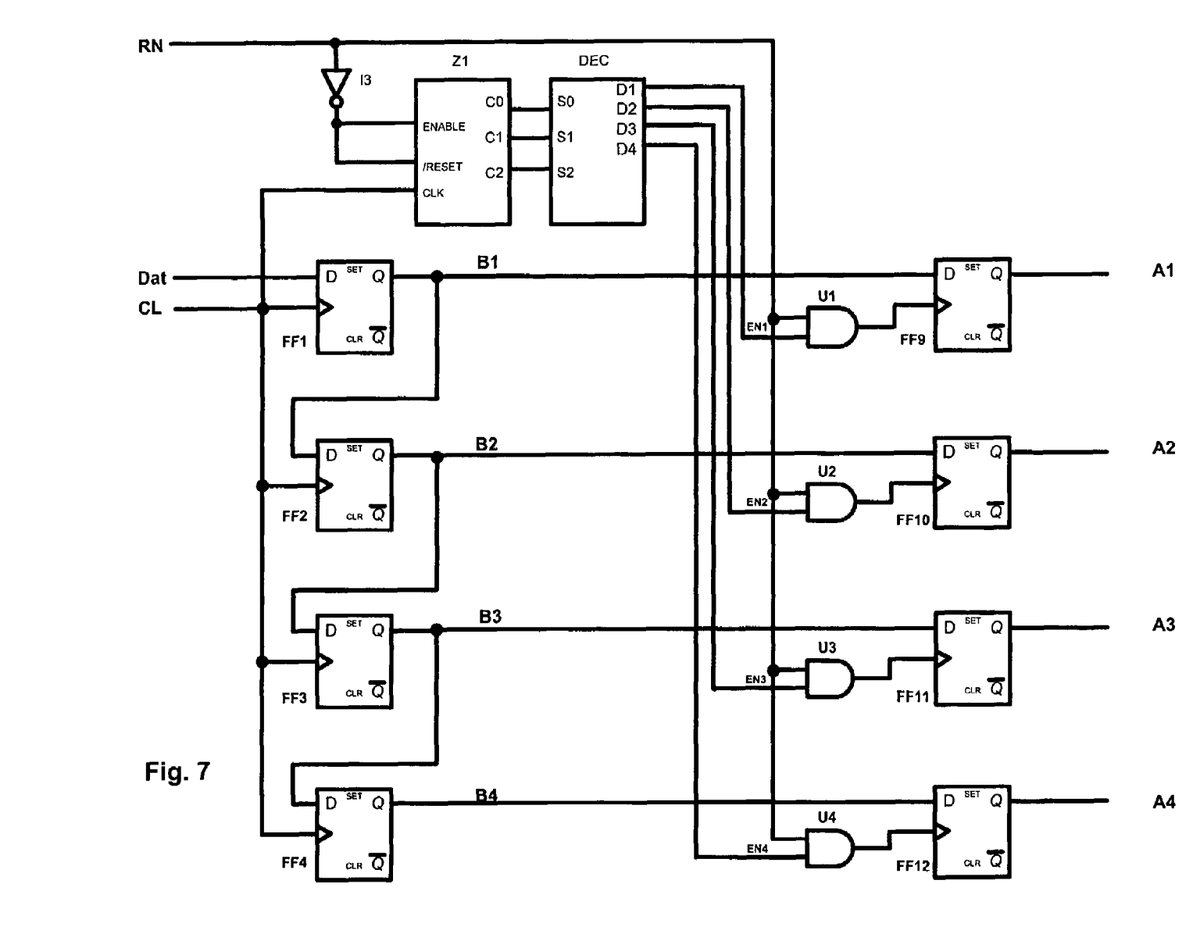

Embodiments of a variable write depth shift register are shown in FIG. 2 and FIG. 7. According to a first embodiment, shown in FIG. 2, an arrangement of a variable write depth shift register comprises in addition to a shift and a latch register an enable shift register, which controls the clock inputs of flip-flops FF9 to FF12 of the latch register. Except said clock inputs of flip-flops FF9 to FF12 of the latch register and the strobe signal ST, the circuit diagram of a variable write depth shift register corresponds to a known serial/parallel or so-called output shift register. The enable shift register inside said embodiment of the variable write depth shift register comprises a number of D-flip-flops FF5 to FF8 and And-gates U1 to U4, which corresponds to the length of a complete data word and two inverter I1 and I2. The clock inputs, the outputs Q and inputs D of the D-flip-flops FF5 to FF8 of the enable shift register are connected as known from a standard shift register, however, the input of the first D-flip-flop FF5 of the enable shift register is supplied via a first inverter I1 with the receive signal RN, which is also applied to one input of each of the And-gates U1 to U4. The other input of the And-gates U1 to U4 is connected with a corresponding output Q of a D-flip-flop FF5 to FF8 and the outputs of said And-gates U1 to U4 supply the clock inputs of the D-flip-flops FF9 to FF12 of the latch register. Furthermore, reset inputs CLR of the D-flip-flops FF5 to FF8 of the enable shift register are connected with each other and for transit time reasons supplied via a second inverter I2 applied to the output of the first inverter I1 with the receive signal RN. Said enable shift register ensures that in cases, where e.g. only the status B1 and B2 of the first D-flip-flops FF1, FF2 next to the input of the input shift register has to be updated that only said status B1 and B2 becomes latched to the output of the of the variable write depth shift register for updating the data word and said enable shift register avoids furthermore that a wrong status B3, B4 of the remaining D-flip-flops FF3, FF4, which may be caused by shifting only the bits next to the input into the shift register, occurs at the output of the variable write depth shift register. Details of the binary values of a serial data transfer in a numerically controlled control system to update an output value of the control system with a variable write depth shift register illustrates a signal diagram in FIG. 5. The signal diagram in FIG. 5 is based on the same assumptions as the diagram shown in FIG. 4 and illustrates the behavior of the enable register. The serial data transfer of the data word 1010 starts from the data word source with switching the receive signal RN to zero, which causes that all And-gates U1 to U4 block a transfer of enable signals EN1 to EN4 to clock inputs of the latch register and that all D-flip-flop FF5 to FF8 are reset via its reset input CLR. Simultaneously a high level corresponding to 1 is applied to the input of the first D-flip-flop FF5 of the enable register due to said low level of the receive signal RN, which is inverted applied to said first D-flip-flop FF5 of the enable register. The D-flip-flops FF1 to FF12 are edge triggered flip-flops and the output Q of a D-flip-flop will only follow the signal applied to the input D during the instant of a clock edge of the clock signal CL. That means that the level or status of a bit of a data word as well as the signal applied to the input D of the first D-flip-flop FF5 occur at the output Q of the corresponding flip-flop with the rising edge of the clock signal CL. As shown in FIG. 5, the status of B1 and EN1, which is the status of output Q of the first D-flip-flop FF5 of the enable shift register alters to high and 1 respectively. With the next clock pulse CL the status of B1 and EN1 are shifted through the second D-flip-flops FF2 and FF6 of the input shift register and the enable shift register and the next bit status 0 of the data word is fed into the first D-flip-flop FF1 of the input shift register. The status of B1 alters to zero, the status of B2 and EN2 alters to high and the status of EN1 remains high. The third and the fourth clock pulses CL shift the corresponding status through both of the register so that with the fourth clock pulse the status B4 to B1 corresponds to the received data word 1010 and all outputs Q of the enable shift register have a status EN1 to EN4 high or enable. After receiving the data word the receive signal RN alters to high, with the result that the And-gates U1 to U4 provide a rising edge signal, which activates the latch register so that the status A1 to A4 of the outputs Q of the D-flip-flops FF9 to FF12 corresponds to the received data word. Furthermore, the altered receive signal RN resets all D-flip-flops FF5 to FF8 of the enable shift register. In that case, where also the bit of a data word alters the status, which has the biggest distance to the input of the input shift register, a duration T1 is required to update the output of the serial/parallel register. However, if the following data word is e.g. 1011 only an alteration of the status B1 of the first D-flip-flop FF1 of the input register or in that case of the lowest significant bit in comparison with the previous received data word 1010 is required. This is e.g. performed by the variable write depth shift register shown in FIG. 2. Data transfer from the not shown data source starts again with an alteration of the receive signal RN to zero and low respectively as it is illustrated at a time scale of 500 ns in FIG. 5. However, as the difference to a previous sent data word is also known at the side of the data source, only the bit near to the input of the shift register, which in this case is the lowest significant bit, and a receive signal RN as well as a number of clock pulses CL, which correspond to the number of bits, which need to be sent from the data source, will be provided from said data source. The status B1 of the output Q of the first D-flip-flop FF1 of the input shift register as well as the status EN1 of the output Q of the first D-flip-flop FF5 of the enable shift register alter to high with the transmitted clock pulse CL and with an alteration of the receive signal RN to high only the status B1 of the output Q of the first D-flip-flop FF1 of the input shift register is latched to the latch register because only the status EN1 of the first D-flip-flop FF5 of the enable shift register is high. That means that by only transmitting one bit of the four bits of the data word 1011 the output of the variable write depth shift register becomes updated to the desired data word at the output of the serial/parallel shift register. The status A1 to A4 surrounded by an ellipse in FIG. 2 to FIG. 4 is the same and has been reached in a shorter time T2. Due to the fact that only one bit has been fed into the input shift register the status B1 to B4 is not consistent wit the status A1 to A4 of the latch register after the data word at the output of the serial/parallel shift register has been updated to the new data word, which is uncommon in comparison to a known serial/parallel shift register. Therefore it is of interest what happens with the irregular data word corresponding to the status B1 to B4 of the input shift register if the next data word or only partly transmitted data word arrives. The behavior is shown in FIG. 6, which is identical until a time scale value of about 550 ns with the signal diagram shown in FIG. 5. It is assumed that the next data word shall be 1010. In that case also only the bit closest to the input of the input shift register alters the status B1 of the output Q of the first D-flip-flop FF1 of the input shift register and the enable shift register avoids that the status B2 to B4 of the D-flip-flops FF2 to FF4 of the input shift register, which is related to bits in the data word, which have not to be updated and are far away from the input of the input shift register confuse the data word, which shall be provided at the output of the latch register. Said update requires also only a short period of time T3, which is comparable with the duration T2. FIG. 6 illustrates in addition to the fact that the duration for updating an output value of the control system in a numerically controlled control system with serial data transfer is shortened that an update may be performed more frequently and the desired update is performed earlier or faster in comparison to a system, which transfers complete data words to update an output value of the control system in a numerically controlled control system in serial load mode as e.g. a DDS synthesizer AD9850.

In addition to the first embodiment a second embodiment of a variable write depth shift register to update an output value of the control system via three lines in serial load mode, is shown in FIG. 7. The circuit diagram of a variable write depth shift register for an improved serial data transfer in a numerically controlled control system to update an output value of the control system according to the embodiment shown in FIG. 7 comprises a counter Z1 and a decoder DEC instead of the enable shift register of the first embodiment. Similar to the previous embodiment, each clock input of a D-flip-flop FF9 to FF12 of the latch register is connected to an output of an And-gate U1 to U4 and one input of each of the And-gates U1 to U4 is supplied by the above mentioned receive signal RN. The other input of each of the And-gates U1 to U4 is separately applied to an output D1 to D4 of the decoder DEC, which via its inputs S0 to S2 is connected to outputs C0 to C2 of the counter Z1. The counter Z1 is enabled and disabled by the receive signal RN via an inverter I3 and counts the number of clock pulses CL during writing bits into the input shift register, which is formed by D-flip-flops FF1 to FF4. The counter Z1 is a binary counter and the decoder DEC provides output signals D1 to D4 according to the following table.

| Inputs | | | Outputs | | | |
|---|---|---|---|---|---|---|
| S2 | S1 | S0 | D4 | D3 | D2 | D1 |
| 0 | 0 | 0 | 0 | 0 | 0 | 0 |
| 0 | 0 | 1 | 0 | 0 | 0 | 1 |
| 0 | 1 | 0 | 0 | 0 | 1 | 1 |
| 0 | 1 | 1 | 0 | 1 | 1 | 1 |
| 1 | 0 | 0 | 1 | 1 | 1 | 1 |

Thereby it is ensured that similar to the first embodiment only a status B1 to B4 of the D-flip-flops FF1 to FF4 of the input register corresponding to the number of bits, which have to be altered to form the new data word are latched to the output of the latch register. That means that a variable write depth shift register simultaneously with the number of bits clocked into the input shift register enables via an enabler EN1 to EN4 the corresponding number of outputs of the latch register when the data transfer terminates and updates the data word at the output of the variable write depth shift register. Output stages of the variable write depth shift register for bit values, which need not to be altered keep the previous status.

A variable write depth shift register is used for serial data transfer in a numerically controlled control system to update an output value of the control system, wherein the write depth depends on the bit of a data word, which has to be altered and has the biggest distance to the input of an input shift register of the variable write depth shift register to provide the desired data word at the output of the variable write depth shift register. The number of bits, which have to be altered to form a current data word from a previous data word is determined at the side of the data source and start as well as end of a transfer of said bits from the source to the variable write depth shift register is indicated by a receive signal RN, which substitutes the strobe signal ST on the corresponding line. The receive signal RN is a binary signal, which indicates start and end of data transfer from the data source to the variable write depth shift register and at the end of data transfer enables the update of the data word at the output of the variable write depth shift register. The embodiments described here are specified only as examples for a four bit data word and a person skilled in the art can realize other embodiments adapted to the maximum length of the data word and the order of bits in the data word, which preferred is selected in such a way that bit values which alter more frequently are arranged near to the input of the input shift register of the variable write depth shift register. The symbols used for D-flip-flops in the drawings show a not used inverted output Q and if a connection to the input SET or input clear CLR of the D-flip-flops is not shown said inputs are disabled by a connection to an appropriate logic level. However, a person skilled in the art can realize other embodiments of the flip-flops which remain within the scope of the invention.

Although the invention has been shown and described with respect to two specific embodiments thereof, it should be understood by those skilled in the art that the foregoing and various other changes, omissions and additions in the form and detail thereof may be made therein without departing from the spirit and scope of this invention.

The invention claimed is:

1. A method for a serial data transfer in a numerically controlled control system to update an output value of the control system, wherein the method comprises:
   determining bits of a current data word, which have to be updated to ensure that the current data word will be provided after the serial data transfer, and
   generating a receive signal according to a number of bits, which has to be transferred for updating the data word, to start and to end the data transfer and to update the output value of the control system;
   wherein the number of bits, which only has to be transferred for updating the data word, depends on a location of a bit value in a data word which has to be altered and has a biggest distance to an input of an input shift register of a variable write depth shift register.

2. Method according to claim 1, further comprising a variable write depth shift register receives only a number of bits according to the location of a bit in a data word, which has to be altered and has the biggest distance to the input of an input shift register of the variable write depth shift register.

3. Method according to claim 1, wherein the location of a bit in a data word is selected in such a way that more frequently alternating bit values are arranged near to the input of an input shift register of the variable write depth shift register.

4. Method according to claim 1, further comprising a receive signal is used to determine start and end of a data serial transfer of bits from a data source to update a data word from a previous data word and enables the update of bit values of a control word at the output of the variable write depth shift register, which have to be altered for updating the data word or output value of the control system.

5. Arrangement for a serial data transfer in a numerically controlled control system to update an output value of the control system, comprising a variable write depth shift register for enabling a number of outputs of a latch register of the variable write depth shift register to be updated when a data transfer from a data source to the variable write depth shift register terminates, which corresponds to a number of received clock pulses writing bit values into an input shift register of the variable write depth shift register for updating the output value or data word at the output of the variable write depth shift register from a previous output value or data word and for keeping bit values of a data word at the output of the variable write depth shift register, which not have to be altered to provide the updated output value or data word at the output of the variable write depth shift register.

6. Arrangement according to claim 5, wherein the variable write depth shift register comprises an input shift register, a latch register and an enable shift register, which ensures that in cases, where only some bits of a data word near to the input of the input register have to be updated to form a desired data word, that only said bit values are latched via the latch register to the output of the variable write depth shift register for updating the data word and avoids that bit values of further stages of the input register, which not have been updated occur at the output of the variable write depth shift register.

7. Arrangement according to claim 5, wherein the variable write depth shift register comprises an input shift register, a latch register, a counter and a decoder, which ensures that in cases, where only some bits of a data word near to the input of the input register have to be updated to form a desired data word, that only said bit values are latched via the latch register to the output of the variable write depth shift register for updating the data word and avoids that bit values of further stages of the input register, which not have been updated occur at the output of the variable write depth shift register.

8. Arrangement according to claim 5, wherein the input shift register is a serial data receiving shift register and the latch register has clock inputs each connected to an output of an And gate having a fist input connected to a line providing a receive signal and a second input connected to an output of an enabler for latching a number of outputs of the input shift register to an output of the variable write depth shift register according to a number of clock pulses received to fed at least on bit value into the input shift register.

9. A variable write depth shift register comprising a serial data receiving input shift register, a latch register and an enabler for counting a number of clock pulses or bit values fed into the input shift register to determine a write depth of the variable write depth shift register, for updating a status of a corresponding number of stages of the latch register and for keeping a status of remaining stages of the latch register.

* * * * *